Patented Oct. 28, 1941

2,260,628

UNITED STATES PATENT OFFICE 2,260,628

HALOGENATED BENZOYL GLYCOLLATE ESTER COMPOSITIONS

Lucas P. Kyrides, Webster Groves, Mo., assignor to Monsanto Chemical Company, St. Louis, Mo., a corporation of Delaware No Drawing. Application March 4, 1937, Serial No. 128,987

21 Claims. (Cl. 260—476)

This invention relates to a novel class of neutral, halogenated benzoic ester compositions. This application is a continuation-in-part of my co-pending applications, Serial No. 618,305, filed June 20, 1932, and Serial No. 648,986, filed December 27, 1932 which have issued respectively as United States Patents 2,073,937 and 2,073,938.

The invention has as one of its objects the provision of a class of organic esters which are substantially non-volatile at normal temperature, are compatible with cellulose ethers and esters, notably cellulose acetate and cellulose nitrate, and which are otherwise adapted for use as camphor substitutes in the manufacture of cellulose lacquers and plastics. The esters disclosed herein are permanently monomeric, non-resinifiable and non-polymerizable. In this respect they are distinguishable from the vinyl type ester compositions which do polymerize and resinify. They have a plasticizing or softening action on phenol-aldehyde resins, styrene resins, vinyl type resins, urea-formaldehyde resins, etc.

The preferred compositions contemplated by the present invention are the mono and poly chloro benzoic acid esters, in which the carboxylic group is esterified by the hydroxyl group of an ester of glycollic acid and its homologues.

The following example illustrates an embodiment of the present invention.

76.5 grams of sodium o-chlorobenzoate are suspended in 55 grams of 99% ethyl alcohol and refluxed with agitation with 55 grams of ethyl chloroacetate for approximately 20 hours. The reaction mixture is then washed with water and the oil layer finally separated. This oil layer containing the ester is purified in the known manner as by distillation.

The product, ortho chlorobenzoyl ethyl glycollate distills at 182°–185° C. under 15 mm. pressure and at 315° C. at atmospheric pressure.

The reaction may be represented as follows:

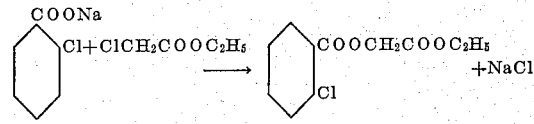

The product is soluble in the ordinary lacquer solvents and has a retentivity with nitro cellulose as well as acetyl cellulose of approximately 100%. That is, a film containing equal parts by weight of the ester and cellulose nitrate or acetate shows no separation after the volatile solvent has been eliminated.

In lieu of a chloroacetate ester one may employ an ester of other mono chloro-substituted fatty acids such as chloropropionic acid or a chlorobutyric acid. Similarly, the meta and para chlorobenzoic acids, including isomeric mixtures thereof, may be substituted for the ortho compound. In lieu of the mono chlorobenzoic acids the di- or tri-chloro compounds may be used. Similarly, in lieu of the ethyl ester of chloroacetic acid one may substitute the chloroacetic acid ester of other alcohols including cresol, phenol, methyl, propyl, butyl, amyl or benzyl alcohol as well as chloroacetic esters of mono alkyl ethers of glycol such as the mono ethyl ether of ethylene glycol and the dialkyl ether of glycerol, etc.

The manner of using the products described herein as plasticizers or softeners is fully set forth in my co-pending applications identified above to which reference is hereby made. In the instant application, the compounds specifically claimed are the mono and poly chlorobenzoyl glycollate esters and homologues of the glycollic esters. These compounds may be represented by the structural formula:

where R represents a divalent aliphatic hydrocarbon group and R₁ represents a monovalent aryl hydrocarbon group in the case of phenolic esters and a monovalent alkyl group in the case of aliphatic alcohol esters.

What I claim is:

1. The ethyl glycollate ester of o-chlorobenzoic acid.

2. A neutral chlorobenzoate ester, the carboxyl group of which is esterified with the hydroxyl group of a glycollate ester, the carboxyl group of said glycollate ester being esterified with a saturated alkyl alcohol containing an ether linkage.

3. A neutral chlorobenzoate ester, the carboxyl group of which is esterified with the hydroxyl group of a glycollate ester, the carboxyl group of said glycollate ester being esterified with a saturated monoalkyl ether of a glycol.

4. A neutral ester of a chlorobenzoic acid, the carboxyl group of which is esterified by the hydroxyl group of an aliphatic ester of a hdyroxy aliphatic acid selected from a group consisting of hydroxyacetic acid, hydroxypropionic acid and hydroxybutyric acid, the aliphatic groups having no unsaturated linkages.

5. A neutral alkyl glycollate ester of a chlorobenzoic acid, wherein said alkyl group is saturated.

6. A neutral ester of a chlorobenzoic acid, the carboxyl group of which is esterified by the hydroxyl group of a saturated alkyl ester of a hydroxy aliphatic acid selected from a group consisting of hydroxy-acetic acid, hydroxypropionic acid and hydroxybutyric acid.

7. A neutral ester of a chlorobenzoic acid, the carboxyl group of which is esterified by the hydroxyl group of a saturated aliphatic ester of glycollic acid.

8. An ester of the following formula:

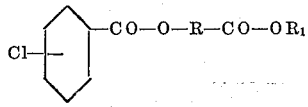

where R represents a divalent saturated aliphatic hydrocarbon group and $R_1$ represents a group selected from the monovalent aryl, monovalent saturated alkoxyalkyl and monovalent saturated alkyl hydrocarbon radicals.

9. A neutral ester of a chlorobenzoic acid, the carboxyl group of which is esterified, by the hydroxyl group of an ester of a hydroxy aliphatic acid, said ester being selected from the group consisting of saturated alkyl saturated alkoxy alkyl and aryl esters.

10. A neutral ester of a chlorobenzoic acid, the carboxyl group of which is esterified by the hydroxyl group of an ester of a hydroxy aliphatic acid, said ester being selected from the group consisting of saturated alkyl saturated alkoxy alkyl and aryl esters and said acid being selected from a group consisting of hydroxy-acetic acid, hydroxypropionic acid and hydroxybutyric acid.

11. A neutral ester of a polychlorobenzoic acid, the carboxyl group of which is esterified by the hydroxyl group of an ester of a hydroxy aliphatic acid, said ester being selected from the group consisting of saturated alkyl saturated alkoxy alkyl and aryl esters.

12. The ethyl glycollate ester of a monochlorobenzoic acid.

13. A neutral ester of a chlorobenzoic acid, the carboxyl group of which is esterified by the hydroxyl group of an ester of hydroxyacetic acid, said ester being selected from the group consisting of saturated alkyl, saturated alkoxyalkyl and aryl esters.

14. A neutral ester of a chlorobenzoic acid, the carboxyl group of which is esterified by the hydroxyl group of an ester of hydroxybutyric acid, said ester being selected from the group consisting of saturated alkyl, saturated alkoxyalkyl and aryl esters.

15. A neutral ester of a polychlorobenzoic acid, the carboxyl group of which is esterified by the hydroxyl group of an ester of a hydroxy aliphatic acid, said ester being selected from the group consisting of saturated alkyl, saturated alkoxyalkyl and aryl esters and said acid being selected from a group consisting of hydroxyacetic acid, hydroxypropionic acid and hydroxybutyric acid.

16. A neutral ester of a polychlorobenzoic acid, the carboxyl group of which is esterified by the hydroxy group of an ester of hydroxybutyric acid, said ester being selected from the group consisting of saturated alkyl, saturated alkoxyalkyl and aryl esters.

17. An ester of the following formula

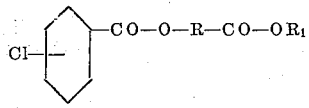

where R represents a divalent saturated aliphatic hydrocarbon group selected from the group consisting of ethylene, propylene and methylene and $R_1$ represents a group selected from the monovalent aryl, monovalent saturated alkoxyalkyl and monovalent saturated alkyl radicals.

18. An ester of the following formula

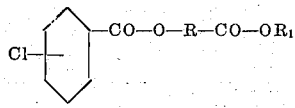

where R represents a saturated methylene group and $R_1$ represents a group selected from the monovalent aryl, monovalent saturated alkoxyalkyl and monovalent saturated alkyl radicals.

19. A neutral chlorobenzoate ester, the carboxyl group of which is esterified with the hydroxyl group of an hydroxy acid selected from the group consisting of hydroxy-acetic acid, hydroxypropionic acid and hydroxybutyric acid, the carboxyl group of said hydroxy acid being esterified with a saturated alkyl alcohol containing an ether linkage.

20. A neutral chlorobenzoate ester, the carboxyl group of which is esterified with the hydroxyl group of hydroxyacetic acid, the carboxyl group of said hydroxyacetic acid being esterified with a saturated alkyl alcohol containing an ether linkage.

21. A neutral chlorobenzoate ester, the carboxyl group of which is esterified with the hydroxyl group of hydroxybutyric acid, the carboxyl group of said hydroxy-butyric acid being esterified with a saturated alkyl alcohol containing an ether linkage.

LUCAS P. KYRIDES.